Feb. 1, 1938.　　　H. J. PERAZZOLI　　　2,106,918
TRANSMISSION MECHANISM
Filed Sept. 5, 1935　　　3 Sheets-Sheet 1

INVENTOR
Henry J. Perazzoli
BY
Synnestvedt & Lechner
ATTORNEYS

Feb. 1, 1938.                H. J. PERAZZOLI                 2,106,918
                           TRANSMISSION MECHANISM
                           Filed Sept. 5, 1935            3 Sheets-Sheet 2

INVENTOR
Henry J. Perazzoli
BY
Symmestvedt & Lechner
ATTORNEYS

Feb. 1, 1938.  H. J. PERAZZOLI  2,106,918
TRANSMISSION MECHANISM
Filed Sept. 5, 1935  3 Sheets-Sheet 3
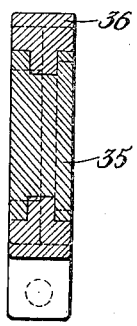
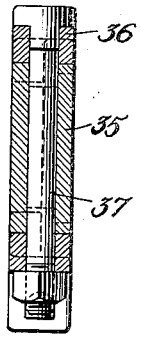
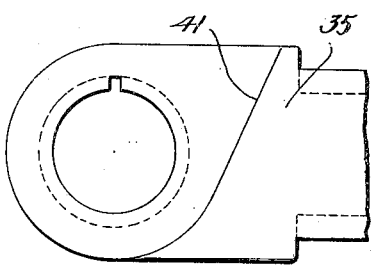
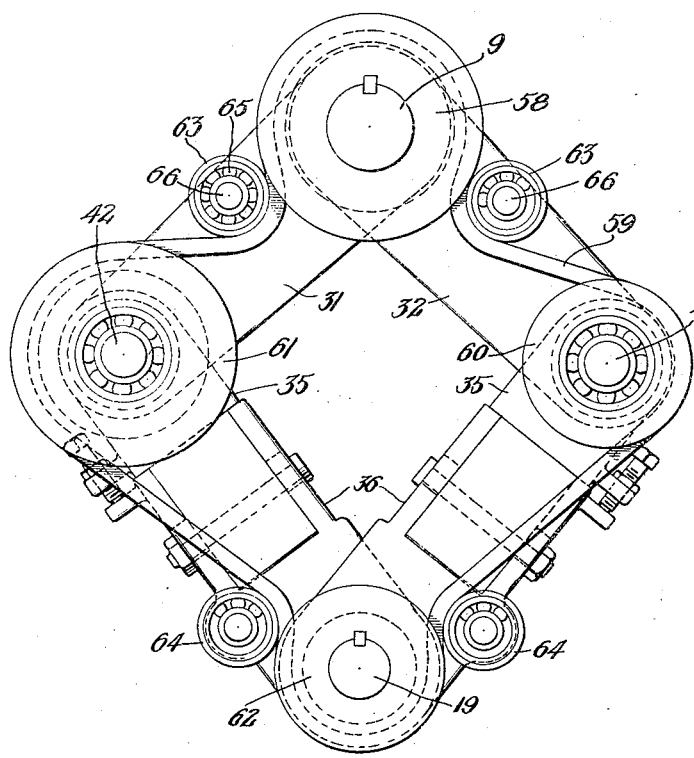
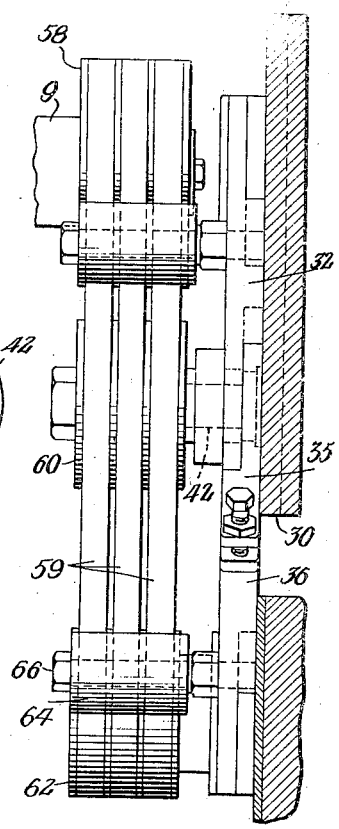
INVENTOR
Henry J. Perazzoli
BY
Synnestvedt & Lechner
ATTORNEYS Patented Feb. 1, 1938

2,106,918

UNITED STATES PATENT OFFICE 2,106,918

TRANSMISSION MECHANISM

Henry J. Perazzoli, Philadelphia, Pa.

Application September 5, 1935, Serial No. 39,228

14 Claims. (Cl. 74—228)

This invention relates to transmission mechanism and is more particularly concerned with a mechanism for the transmission of power between a driven shaft and a driving shaft arranged in parallel relation and adjustable toward and away from each other.

Still more specifically, the invention contemplates a flexible chain or belt drive between relatively adjustable and parallel driving and driven shafts, the chain or belt drive being arranged to transmit the rotation of the driving shaft to the driven shaft in any adjusted position of the two shafts and during adjustment thereof.

The nature, objects and advantages of the invention will be best understood from a consideration of the following description referring to the accompanying drawings, in which I have illustrated my improved transmission mechanism associated with a rail grinding machine, in which association it has especial advantage as will appear more fully herebelow.

Figure 1:
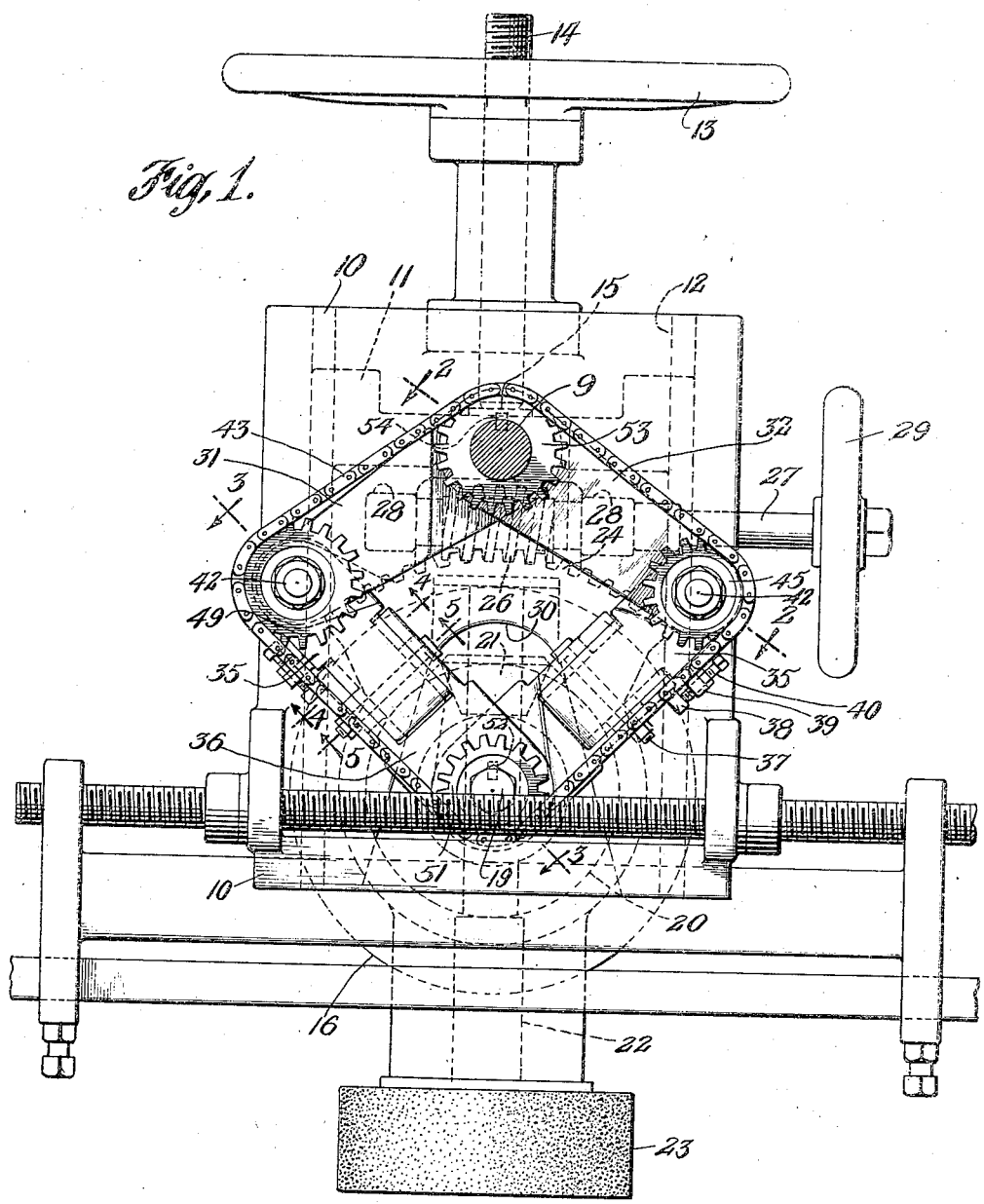
Figure 1 is a face view of the transmission mechanism as applied to a grinding machine, the immediately associated and cooperating parts of the latter machine also being illustrated.

Figures 4, 5, and 6 are views of certain details, the first two being taken as indicated by the section lines 4—4 and 5—5 on Figure 1; and Figures 7 and 8 are face and side views of a modified form of the transmission mechanism.

Figure 2:
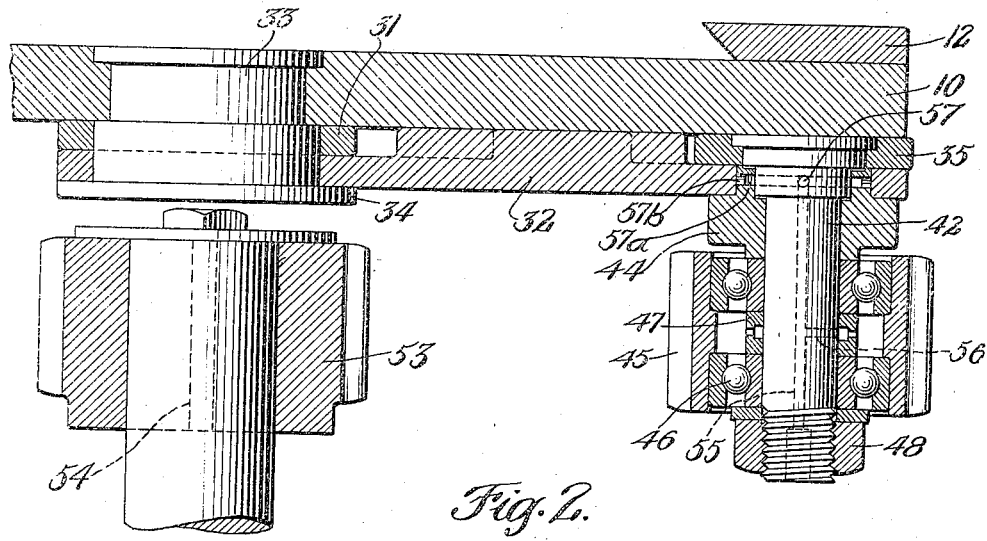
Figure 2 is a fragmentary sectional view taken substantially as indicated by the section line 2—2 on Figure 1.
Figure 3:
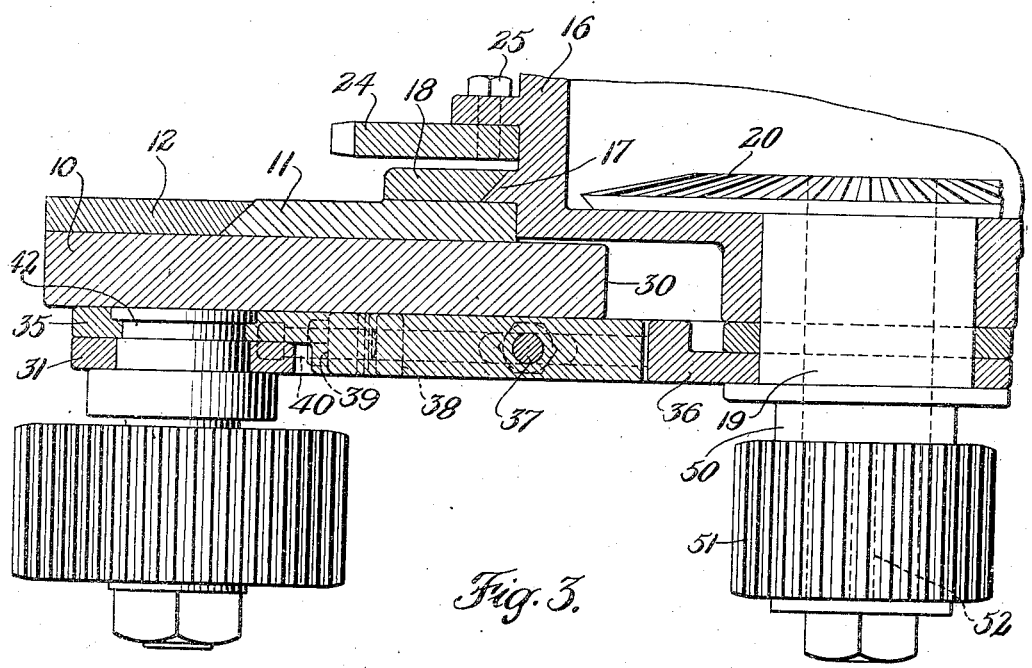
Figure 3 is a fragmentary sectional view taken as indicated by the section line 3—3 on Figure 1.

While, as above indicated, my improved transmission mechanism is adapted to a variety of uses, for purposes of illustration I have shown it in association with a grinding mechanism in which it is of especial advantage. In order to bring out the advantages and arrangement of the structure reference is first made to certain features of the grinding machine as shown in Figures 1, 2, and 3, especially Figure 1. A machine of the character here illustrated is adapted to be mounted on a truck or equivalent running gear for riding on the rails of a trackway such as a street car or railroad trackway. The truck carries a prime mover coupled with and driving shaft 9. The truck further carries a frame 10 which is fixed with respect to the prime mover, although the two may be movable on the truck as a unit so as to adjust the position of the grinding machine with reference to the rails to be ground. A vertical plate 11 is mounted in the frame 10 as by undercut or beveled guides 12 whereby to permit the plate to move vertically upward and downward. To effect this movement a hand wheel 13 is employed, the same being threaded on a spindle 14 which is connected as at 15 with the plate 11.

The plate 11 further carries a drum 16 which has a circumferentially extending and beveled flange 17 engaged by a similarly shaped guide 18 whereby to permit the drum to be rotated about an axis perpendicular to the plane of the plate, the said axis being coincident with the axis of the shaft 19 constituting the driven element in the transmission mechanism of this invention. The main frame plate 10, as will be seen in Figures 1 and 3, is cut out as at 30 to pass the shaft 19 and the associated part of the drum 16 in which this shaft is mounted and thus permit freedom for vertical movement of the projecting end of this shaft with reference to the fixed framing. As shown in Figures 1 and 3, shaft 19 carries a bevel gear 20 disposed internally of the drum 16 and meshing with the beveled pinion 21 which is mounted toward the upper end of shaft 22, this latter shaft being extended downwardly out of the drum 16 and carrying at its lower end an abrasive or grinding element 23.

For the purpose of rotating the drum 16 and thus swinging the grinding element from side to side about a center point coincident with the axis of shaft 19, I provide a segmental worm wheel 24 adjacent the top of the drum and secured thereto as by studs 25 (see Figure 3). A cooperating worm 26 mounted on shaft 27 is provided with spaced bearings 28 whereby upon rotation of the hand wheel 29 (also mounted on shaft 27) the drum 16 and the associated grinding element are rocked with reference to the supporting plate 11.

While shaft 9 overlies plate 11 as viewed in Figure 1, it is here noted that this shaft is not supported in plate 11, as appears in Figure 2. Thus it will be seen that in operation of the grinding machine, shaft 19 which serves to actuate the grinding element 23 is adjustable vertically with respect to shaft 9. In addition the structure in which shaft 19 is mounted is also capable of a rocking adjustment.

In accordance with the invention I have provided a power transmission means for delivering torque from shaft 9 to shaft 19 regardless of the relative adjustments of the two shafts. The transmission mechanism is further capable of delivering power during the time an adjustment is being made. In this way no interference with the work being carried on is necessary even when the grinding wheel is being adjusted to a different height or to a different angular position. The structure employed to accomplish this purpose comprises a four-point gear suspension system provided by four pivotally interconnected arms. Two of these arms, 31 and 32, are jointly pivoted to the fixed framing plate 11 by means of a fitting 33 (see Figure 2) having a flange 34 for maintaining the arms substantially flush against the plate 10. The adjacent ends of these two arms (31 and 32) each have half of their thickness cut-out so that they interfit and thus lie in a common plane. The other two arms are each of multi-part construction, each comprising male and female parts 35 and 36 which interfit in the manner shown in Figures 1 and 4. These arms furthermore are provided with slot-shaped apertures for the reception of a securing bolt 37 (see Figure 5) by means of which they may be adjusted in length and fixed in any given adjustment. An adjusting device comprising a lug 38 carried by member 36 and a lug 39 carried by member 35 in the latter of which an adjusting bolt 40 is threaded serves to relatively separate members 35 and 36 upon loosening the securing bolt 37. These latter two arms (35—36, 35—36) are cut out toward their ends so as to interfit and lie in a common plane. Figure 6 illustrates one of the members 35 and the manner in which it is cut out toward its end. (See the shoulder 41 which defines the line on which the end part is cut away.) These two adjustable arms are furthermore pivoted to each other on the shaft 19 (see the lower right hand corner of Figure 3). Thus it will be seen that the pivot for the lower arms is vertically movable with shaft 19 and thus also with the adjustable plate 11 (when the hand wheel 13 is manipulated).

The free ends of the two pairs of arms described above are also apertured and pivoted to each other in the pattern indicated in Figure 1. Thus by reference to the right hand side of Figures 1 and 2, arm 32 is pivoted to the lower arm member 35 by means of a pivot element 42. In like manner, toward the left of Figures 1 and 3 arm 31 is pivoted to the left hand member 35 by means of a pivot element 42.

In addition to the function of pivoting the arms to each other, the pivots, i. e., the elements 42 and shaft 19, also serve to carry gears adapted to cooperate with the flexible chain 43. The mounting of one of the gears on its pin 42 is clearly illustrated toward the right of Figure 2 in which it will be seen that a fitting 44 is positioned on the pin 42 at the outer face of the arms, this fitting serving to space the gear 45 from the arms and thus bring the plane of the chain away from the plane of the arms. The gear is carried on suitable roller bearings 46 which are separated by a spacer 47 and clamped against the outer edge of fitting 44 by means of a nut 48 threaded on the end of pin 42. A further feature of this gear mounting is involved in the provision of lubrication ducts comprising the passage 55 having an opening through one end of the pin 42 into which lubricant may be delivered, and other passages 56 for delivery of lubricant to the bearings 46 and 47 and 57 for delivery of lubricant to the pivot joint between the arms through groove 57a and ducts 57b in the fitting 44. An essentially similar structure is used for the mounting of gear 49 appearing toward the left of Figure 1.

At the bottom, the shaft 19 carries a spacer element 50 and also a gear 51, the gear in this instance being keyed to the shaft as indicated at 52 in Figure 1.

Toward the top the motor or drive shaft 9 has a gear 53 secured thereto as by a key 54.

From the above it will be seen that gears 45 and 49 serve as idlers for the chain, gear 53 being the driving gear and gear 51 the driven gear. Thus with the chain in engagement with the four gears, power is transmitted from the drive shaft 9 to the driven shaft 19. Upon adjustment of the hand wheel 13, which moves the plate 11 vertically and with it the driven shaft 19 together with the grinding element, the gear supporting arms pivot with respect to each other and thus bring the idlers closer together or separate them, according to the sense in which an adjustment is made. In view of this the chain is not slackened or tightened as a result of adjustments and operation of the drive may, therefore, continue while adjustments are being made. In accomplishing this purpose it is important that the distances between the center of the drive shaft 9 and of the two idler gears be equal. Similarly, the distances between the axis of the driven gear and of the two idler gears should also be equal, although the distance between the driving shaft and an idler need not necessarily be the same as that between such idler and the driven shaft. It is with this in mind that I have formed two of the arms (the lower two in Figure 1) of relatively adjustable members. When it is desired to take up slack in the chain these two lower arms are preferably adjusted an equal amount and the drive will then function as before.

It is also of importance to note that the fitting 33 serving to pivot the two upper arms 31 and 32 to the frame plate 10 is positioned with its axis in approximate alinement with the axis of the driving shaft 9. This chain drive, however, further serves to compensate for any slight misalinement which may result from the engine mounting or installation. The drive thus serves two functions, first, to permit relative adjustment of the driving and driven shafts and, secondly, to compensate for disalinement of the driving shaft.

It will further be observed that the mechanism permits the swinging adjustment of the grinding element already described above under the influence of rotation of the hand wheel 29, without disturbing the transmission of power from the motor to the grinding element itself.

Figures 7 and 8 illustrate a modified form of my improved transmission adapted to utilize a belt drive instead of a chain drive. In this instance the arm arrangement is essentially the same as that already described. The drive shaft 9, however, carries a pulley 58, preferably multi-grooved so as to receive a plurality of belts 59. These may desirably be of V section. Instead of idler gears, idler pulleys 60 and 61 are employed and the driven shaft 19 carries a similar multi-grooved pulley 62. This arrangement further contemplates the use of pairs of rollers 63 and 64 riding on the outside of the belts 59. Each roller is preferably mounted on a roller bearing 65 which in turn rides on pin 66 secured to the supporting arms. The pair of rollers 65 is positioned close to the pulley 58 and the pair 64 close to the pulley 62. While these rollers might not always be essential I prefer to use them since they avoid decreasing the engagement of the belts and the driving and driven pulleys when the driving and driven shafts 9 and 19 are brought close together. In the absence of these rollers, when the driving and driven shafts are brought close together the consequent separation of the idler pulleys 60 and 61 would very considerably reduce the contact length of the belts and the driving and driven pulleys.

Another important feature of both forms of the mechanism described above resides in the fact that my improved transmission may be employed not only for transmitting a 1 to 1 ratio but also for transmitting any desired speed change. In both Figures 1 and 7 I have shown the driving element (gear or pulley) as being of greater diameter than the driven element, so that this mechanism would increase the rotational speed of the driven shaft as compared with the driving shaft. Under these circumstances, in order to ensure operation of the transmission as above described, the sum of the diameters of the driving and driven gears should be equal to the sum of the diameters of the idler gears. This may conveniently be accomplished by making one of the idlers of the same diameter as the driving element and the other idler of the same diameter as the driven element. Thus in Figure 1 idler gear 45 has the same diameter or pitch line as the driven gear 51 and idler 49 has the same diameter or pitch line as the driving gear. The same condition has been illustrated in Figure 7 as applied to the pulleys.

From the foregoing it will be seen that this invention provides a transmission mechanism adapted to couple spaced and parallel driving and driven shafts which are adjustable relative to each other. The construction compensates for disalignment of the driving shaft and is also capable of effecting a speed reduction or step-up.

I claim:—

1. Equipment of the character described including a driven shaft and a driving shaft relatively adjustable with respect to each other, four links two of which are pivoted to each other on an axis substantially coincident with that of the driving shaft and the other two of which are pivoted to each other on an axis substantially coincident with that of the driven shaft, pivot means joining the free ends of said links in pairs to form an angular figure the corners of which are defined by the pivots, pulleys mounted on said shafts, pulleys mounted substantially coaxially with said pivot means and serving as idlers, an endless belt engaging said pulleys, and a pair of rollers mounted to move with one of said links, the rollers being positioned to ride on the outer surface of the belt adjacent to but at opposite sides of one of the pulleys first mentioned.

2. Drive mechanism of the character described including driving and driven shafts, means mounting said shafts in substantially parallel relation with freedom for movement toward and away from each other, a rotative driving member on the driving shaft, a rotative driven member on the driven shaft, an endless flexible driving element engaging said members whereby to deliver power from the driving shaft to the driven shaft, a pair of idler members engaged by said element, and means for separating said idler members upon movement of the driving and driven shafts toward each other, and vice versa.

3. Drive mechanism of the character described including driving and driven shafts, means mounting said shafts in substantially parallel relation with freedom for movement toward and away from each other, a rotative driving member on the driving shaft, a rotative driven member on the driven shaft, one of said members being of larger diameter than the other, an endless flexible driving element engaging said members whereby to deliver power from the driving shaft to the driven shaft, a pair of idler members engaged by said element, the sum of the diameters of said idler members being equal to the sum of the diameters of the members first mentioned, and means for separating said idler members upon movement of the driving and driven shafts toward each other, and vice versa.

4. Drive mechanism of the character described including driving and driven shafts, means mounting said shafts in substantially parallel relation with freedom for movement toward and away from each other, a rotative driving member on the driving shaft, a rotative driven member on the driven shaft, an endless flexible driving element engaging said members whereby to deliver power from the driving shaft to the driven shaft, a pair of idler members engaged by said element, means for separating said idler members upon movement of the driving and driven shafts toward each other, and vice versa, and means for adjusting the position of one of said shafts with respect to said idler members.

5. Equipment of the character described including a driven shaft and a driving shaft relatively adjustable with respect to each other, four links two of which are pivoted to each other on an axis substantially coincident with that of the driving shaft and the other two of which are pivoted to each other on an axis substantially coincident with that of the driven shaft, pivot means joining the free ends of said links in pairs to form an angular figure the corners of which are defined by the pivots, a rotating driving member on the driving shaft, a rotative driven member on the driven shaft, rotative idler members mounted substantially coaxially with said pivot means, and an endless flexible driving element engaging said members.

6. Equipment of the character described including a driven shaft and a driving shaft relatively adjustable with respect to each other, four links two of which are pivoted to each other on an axis substantially coincident with that of the driving shaft and the other two of which are pivoted to each other on an axis substantially coincident with that of the driven shaft, pivot means joining the free ends of said links in pairs to form an angular figure the corners of which are defined by the pivots, a rotative driving member on the driving shaft, a rotative driven member on the driven shaft, rotative idler members mounted substantially coaxially with said pivot means, and an endless flexible driving element engaging said members, at least one of said links comprising relatively movable parts providing adjustable extensibility of the said link.

7. Equipment of the character described including a driven shaft and a driving shaft relatively adjustable with respect to each other, four links two of which are pivoted to each other on an axis substantially coincident with that of the driving shaft and the other two of which are pivoted to each other on an axis substantially coincident with that of the driven shaft, pivot means joining the free ends of said links in pairs to form an angular figure the corners of which are defined by the pivots, a rotative driving member on the driving shaft, a rotative driven member on the driven shaft, rotative idler members mounted substantially coaxially with said pivot means, and an endless flexible driving element engaging said members, the axes of the idlers being substantially equidistant from the axis of the driving shaft and further being substantially equidistant from the axis of the driven shaft.

8. Equipment of the character described including a driven shaft and a driving shaft relatively adjustable with respect to each other, four links two of which are pivoted to each other on an axis substantially coincident with that of the driving shaft and the other two of which are pivoted to each other on an axis substantially coincident with that of the driven shaft, pivot means joining the free ends of said links in pairs to form an angular figure the corners of which are defined by the pivots, a rotative driving member on the driving shaft, a rotative driven member on the driven shaft, rotative idler members mounted substantially coaxially with said pivot means, and an endless flexible driving element engaging said members, the axes of the idlers being substantially equidistant from the axis of the driving shaft and further being substantially equidistant from the axis of the driven shaft, said driving and driven members being of different diameters and the sum of the diameters of the idlers being equal to the sum of the diameters of the driving and driven members.

9. Equipment of the character described including a driven shaft and a driving shaft relatively adjustable with respect to each other, four links two of which are pivoted to each other on an axis substantially coincident with that of the driving shaft and the other two of which are pivoted to each other on an axis substantially coincident with that of the driven shaft, pivot means joining the free ends of said links in pairs to form an angular figure the corners of which are defined by the pivots, a rotative driving member on the driving shaft, a rotative driven member on the driven shaft, rotative idler members mounted substantially coaxially with said pivot means, and an endless flexible driving element engaging said members, said driving and driven members being of different diameters and the diameter of one idler being equal to the diameter of the driving member and the diameter of the other idler being equal to the diameter of the driven member.

10. Equipment of the character described including a driven shaft and a driving shaft relatively adjustable with respect to each other, four links two of which are pivoted to each other on an axis substantially coincident with that of the driving shaft and the other two of which are pivoted to each other on an axis substantially coincident with that of the driven shaft, pivot means joining the free ends of said links in pairs to form an angular figure the corners of which are defined by the pivots, a rotative driving member on the driving shaft, a rotative driven member on the driven shaft, rotative idler members mounted substantially coaxially with said pivot means, and an endless flexible driving element engaging said members, the sum of the diameters of the idlers being equal to the sum of the diameters of the driving and driven members.

11. Equipment of the character described including a driven shaft and a driving shaft relatively adjustable with respect to each other, four links two of which are pivoted to each other on an axis substantially coincident with that of the driving shaft and the other two of which are pivoted to each other on an axis substantially coincident with that of the driven shaft, pivot means joining the free ends of said links in pairs to form an angular figure the corners of which are defined by the pivots, a rotative driving member on the driving shaft, a rotative driven member on the driven shaft, rotative idler members mounted substantially coaxially with said pivot means, and an endless flexible driving element engaging said members, the links pivoted coaxially with one of said shafts being of multipart interengaging construction providing for adjustable extension thereof.

12. Equipment of the character described including a driving shaft, an adjustable driven shaft, a movable support for the driven shaft providing for adjustment thereof, four links two of which are pivoted to each other on an axis substantially coincident with that of the driving shaft and the other two of which are pivoted to each other on an axis substantially coincident with that of the driven shaft, pivot means joining the free ends of said links in pairs to form an angular figure the corners of which are defined by the pivots, a rotative driving member on the driving shaft, a rotative driven member on the driven shaft, rotative idler members mounted substantially coaxially with said pivot means, an endless flexible driving element engaging said members, an additional shaft mounted on said support with its axis at an angle to but intersecting the axis of the driven shaft, the additional shaft being mounted for pivotal movement, and gearing interconnecting the driven shaft and the additional shaft, whereby power may be delivered to the said additional shaft regardless of pivotal movement thereof or of movement thereof with said support and driven shaft.

13. Drive mechanism of the character described including rotative driving and driven members, means mounting said members with their rotative axes in substantially parallel relation and with freedom for movement toward and away from each other, an endless flexible driving element in driving engagement with said members to transmit power from the driving member to the driven member, a pair of idler members for said element, and means for separating said idler members upon movement of the driving and driven shafts toward each other and vice versa.

14. Drive mechanism of the character described including rotative driving and driven members, means mounting said members with their rotative axes in substantially parallel relation and with freedom for movement toward and away from each other, an endless flexible driving element in driving engagement with said members to transmit power from the driving member to the driven member, a pair of rotative idler devices on which said element rides, one of said devices being in engagement with the element in one run thereof between the driving and driven members, and the other of said devices being in engagement with the element in the other run thereof between the driving and driven members, a mechanism mounting said idler devices and providing for movement thereof toward and away from each other in accordance with relative movements of the driving and driven members, the movement of the idler devices being such as to take up slack in the flexible element resulting from movement of the driving and driven members toward each other, and vice versa, whereby to maintain a guided path of movement for the flexible element, which path is of uniform length regardless of the relative position of the driving and driven members.

HENRY J. PERAZZOLI.